United States Patent
Alexander et al.

(10) Patent No.: US 10,989,436 B2
(45) Date of Patent: Apr. 27, 2021

(54) VANELESS VENTILATION SYSTEM FOR CONFORMAL OUTLETS

(71) Applicants: GM Global Technology Operations LLC, Detroit, MI (US); The Regents of the University of Michigan, Ann Arbor, MI (US)

(72) Inventors: Paul W. Alexander, Ypsilanti, MI (US); Diann Brei, Milford, MI (US); Jonathan E. Luntz, Ann Arbor, MI (US); Mary McMeekin, Ann Arbor, MI (US); Laura Alejandra Giner Muñoz, Ann Arbor, MI (US); Koray Benli, Ann Arbor, MI (US)

(73) Assignees: GM Global Technology Operations LLC, Detroit, MI (US); The Regents of the University of Michigan, Ann Arbor, MI (US)

( * ) Notice: Subject to any disclaimer, the term of this patent is extended or adjusted under 35 U.S.C. 154(b) by 275 days.

(21) Appl. No.: 16/042,038

(22) Filed: Jul. 23, 2018

(65) Prior Publication Data
US 2019/0301767 A1     Oct. 3, 2019

Related U.S. Application Data

(60) Provisional application No. 62/650,559, filed on Mar. 30, 2018.

(51) Int. Cl.
| | |
|---|---|
| *B60H 1/02* | (2006.01) |
| *F24F 13/02* | (2006.01) |
| *F15D 1/02* | (2006.01) |
| *B60H 1/00* | (2006.01) |

(52) U.S. Cl.
CPC ..... *F24F 13/0218* (2013.01); *B60H 1/00564* (2013.01); *F15D 1/02* (2013.01)

(58) Field of Classification Search
CPC ..... F24F 13/0218; B60H 1/00564; F15D 1/02
USPC .......................................................... 454/69
See application file for complete search history.

(56) References Cited

U.S. PATENT DOCUMENTS

| | | | | |
|---|---|---|---|---|
| 6,050,892 A | * | 4/2000 | Sodec | F24F 13/06 454/289 |
| 2014/0254090 A1 | * | 9/2014 | Gardner | F24F 13/0218 361/679.49 |

FOREIGN PATENT DOCUMENTS

| | | | | |
|---|---|---|---|---|
| DE | 3908312 A1 | * | 9/1990 | .......... C09B 57/004 |
| JP | H0583652 U | * | 11/1993 | ............... B60H 1/34 |
| JP | H1-120043 U | * | 8/1998 | .............. F24F 13/10 |

OTHER PUBLICATIONS

English translation of DE-3908312-A1, JP-H0583652-U and JP-H1-120043U.*

* cited by examiner

*Primary Examiner* — Helena Kosanovic
(74) *Attorney, Agent, or Firm* — Quinn IP Law (57) ABSTRACT

A vaneless ventilation system includes a rigid duct and a vent assembly in fluid communication with the duct. The vent assembly includes a rigid housing defining an outlet, a bendable duct disposed inside the rigid housing, a linkage assembly coupled to the bendable duct to allow deflection of the bendable duct upon movement of the linkage assembly, and an actuation mechanism coupled to the linkage assembly, wherein actuation of the actuation mechanism causes the linkage assembly to move, thereby deflecting the bendable duct.

8 Claims, 9 Drawing Sheets

VANELESS VENTILATION SYSTEM FOR CONFORMAL OUTLETS

CROSS-REFERENCE TO RELATED APPLICATION

This application claims priority to, and the benefit of, U.S. Provisional Patent Application No. 62/650,559, filed on Mar. 30, 2018.

INTRODUCTION

The present disclosure relates to a ventilation system for conformal outlets.

Some vehicles include vane vents systems that are bulky, have many parts, and are difficult to package in tight spaces or in configuration with complex curvatures. It is therefore desirable to develop vaneless ventilation systems.

The presently disclosed vaneless ventilation system can control the direction of airflow by manipulating the curvature of the duct walls proximate to its outlet. In other words, the present disclosure describes a vaneless ventilation system that deflects duct walls to control the airflow in high aspect ratio vents.

SUMMARY

The present disclosure describes a vaneless ventilation system that controls the direction of airflow by bending duct walls that are adjacent to a vent outlet. This vaneless ventilation system has a motorized system with bendable duct walls to allow from straight airflow, upward airflow, and downward airflow, as well as intermediate positions across a range. This vaneless ventilation system has an extremely low profile. In some embodiments, the vaneless ventilation system includes a pneumatic actuator. Soft bladders (i.e., duct walls) allow for the vent to be installed in areas of multiple degrees of curvature. The elastic bladders (i.e., duct walls) provide proportional air flow control.

In certain embodiments, the vaneless ventilation system includes a rigid duct and a vent assembly in fluid communication with the duct. The vent assembly includes a rigid housing defining an outlet, a bendable duct disposed inside the rigid housing, a linkage assembly coupled to the bendable duct to allow deflection of the bendable duct upon movement of the linkage assembly, and an actuation mechanism coupled to the linkage assembly, wherein actuation of the actuation mechanism causes the linkage assembly to move, thereby deflecting the bendable duct. The vaneless ventilation system allows infinite position adjustment of the bendable duct.

The vaneless ventilation system may further include an actuation mechanism that is a servo motor. The linkage assembly may include one or more four-bar linkages. The vaneless ventilation system may further include a plurality of arms coupled between the bendable duct and the linkage assembly to allow deflection of the bendable duct upon movement of the linkage assembly. The arms are slidably coupled to the rigid housing. The rigid housing defines a plurality of curved slots. Each of the curved slots slidably receives a portion of one of the arms. The vaneless ventilation system may further include a plurality of wires coupled to the plurality of arms to control a shape of the bendable duct upon movement of the linkage assembly. The rigid housing includes a first material. The bendable duct includes a second material. The first material has a first stiffness, the second material has a second stiffness, and the first stiffness is greater than the second stiffness. The rigid housing includes a first half-portion and a second half-portion. Each of the first half-portion and the second half-portion is coupled to the rigid duct. Each of the first half-portion and the second half-portion includes a hose connector to draw a vacuum or pump a gas between the rigid housing and the bendable duct, thereby facilitating deflection of the bendable duct. The vaneless ventilation system may further include a damper in fluid communication with the rigid duct to regulate a flow of air.

The present disclosure also relates to a vehicle. The vehicle includes a dashboard including a plurality of trim panels and a vent defined along at least one of the plurality of trim panels. The vehicle further includes a vaneless ventilation system defining the vent. In particular, the outlet of the rigid housing defines the vent. The vehicle may include a controller in electronic communication with the actuation mechanism and a human-machine interface in electronic communication with the controller. The human-machine interface is configured to receive a first command input, a second command input, a third command input, and fourth command input. The controller is programmed to actuate the actuation mechanism to move the arms to a position to cause an upward deflection of the bendable duct in response to receiving the first command input through the human-machine interface, thereby directing the airflow in a downward direction. The controller is programmed to actuate the actuation mechanism to move the arms to a position that does not deflect the bendable duct in response to receiving the second command input through the human-machine interface, thereby directing the airflow in a horizontal, straight direction. The controller is programmed to actuate the actuation mechanism to move the arms to a position to cause a downward deflection of the bendable duct in response to receiving the third command input through the human-machine interface, thereby directing the airflow in an upward direction. The controller is programmed to actuate the actuation mechanism to move the arms to a position to cause an inward deflection of the bendable duct in response to receiving the fourth command input through the human-machine interface, thereby precluding the airflow through the bendable duct; The vaneless ventilation system allows infinite position adjustment of the bendable duct.d In certain embodiments, the vehicle includes a dashboard including a plurality of trim panels, a vent defined along at least one of the plurality of trim panels, and a vaneless ventilation system defining the vent. The vaneless ventilation system includes a vent assembly in fluid communication with the rigid duct. The vent assembly includes a rigid housing defining an outlet. The rigid housing includes a first half-portion and a second half-portion. Each of the first half-portion and the second half-portion is coupled to the rigid duct. The vent system further includes a bendable duct disposed inside the rigid housing and an actuation mechanism coupled to the bendable duct. The actuation of the actuation mechanism causes the bendable duct to deflect to control a direction of an airflow exiting through the outlet. The actuation mechanism includes a pneumatic actuator. Each of the first half-portion and the second half-portion of the rigid housing includes a hose connector coupled to the pneumatic actuator to draw a vacuum or pump a gas between the rigid housing and the bendable duct, thereby facilitating deflection of the bendable duct. The rigid housing includes a corrugated material to allow formation of complex shapes.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 15 is a graph showing the relationship of the vent angle and the external air speed for each position of the bendable duct.

DETAILED DESCRIPTION

Figure 1:
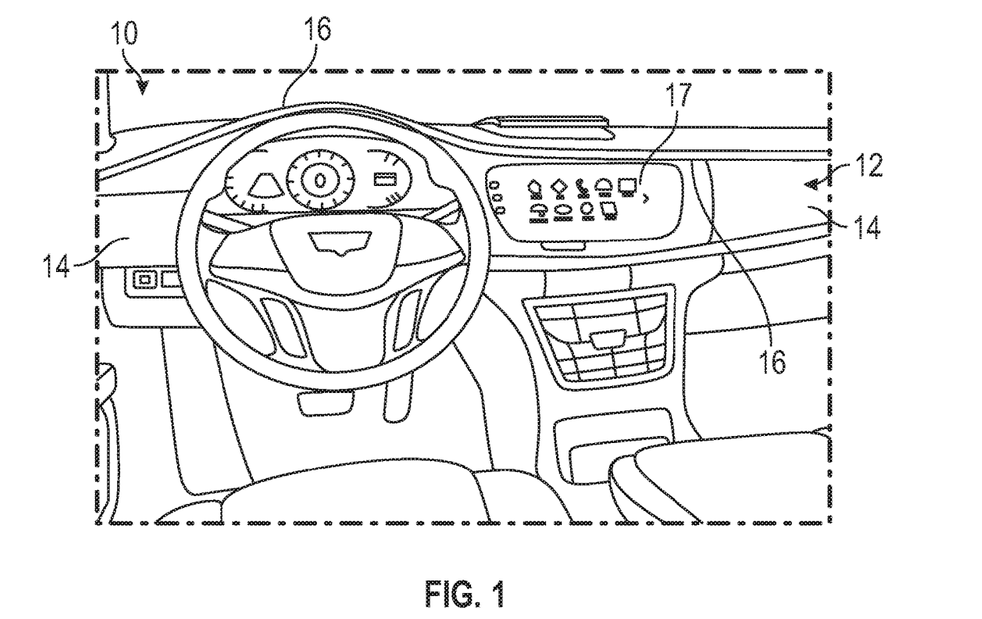
FIG. 1 is a schematic front view of a vehicle including a vaneless ventilation system.

With reference to FIG. 1, a vehicle 10 includes a dashboard 12 (also referred to as instrument panel), which includes one or more trim panels 14. The vehicle 10 further includes one or more vents 16 defined along the trim panels 14. Alternatively or additionally, the vents 16 may be incorporated into a side pillar, console, door, headliner/roof, floorboard or a seat of the vehicle 10. While the vents 16 do not include vanes, these vents 16 can nevertheless control the direction of airflow AF as described in detail below. The dashboard 12 may additionally include a human-machine interface (HMI) 17 configured to receive inputs from a user (e.g., vehicle operator). As a non-limiting example, the HMI 17 may be a touch screen that is capable of receiving inputs via a user's touch.

Figure 2:
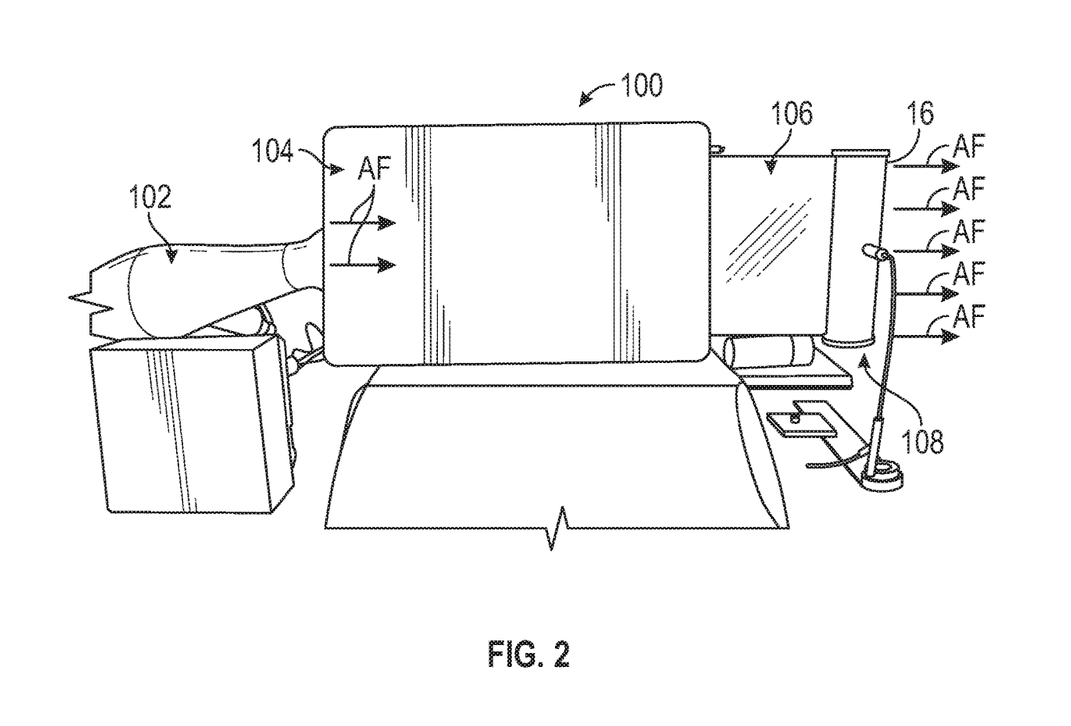
FIG. 2 is a schematic perspective view of the vaneless ventilation system.

With reference to FIG. 2, the vents 16 are defined by one or more vaneless ventilation systems 100. The vaneless ventilation system 100 includes an air source 102 to supply air and a damper 104 in fluid communication with the air source 102. The damper 104 is configured to regulate the flow of gas (e.g., air). The vaneless ventilation system 100 further includes a rigid duct 106 in fluid communication with the damper 104. The rigid duct 106 may be wholly or partly made of aluminum and receives air from the air source 102. Thus, airflow AF can travel from the air source 102, through the damper 104, and into the rigid duct 106. The rigid duct 106 may be shaped as a cuboid to promote laminar flow of air. The vaneless ventilation system 100 further includes a vent assembly 108 in fluid communication with the rigid duct 106. Consequently, the air from the air source 102 can flow from rigid duct 106 to the vent assembly 108. The vent 16 is part of the vent assembly 108.

Figure 3:
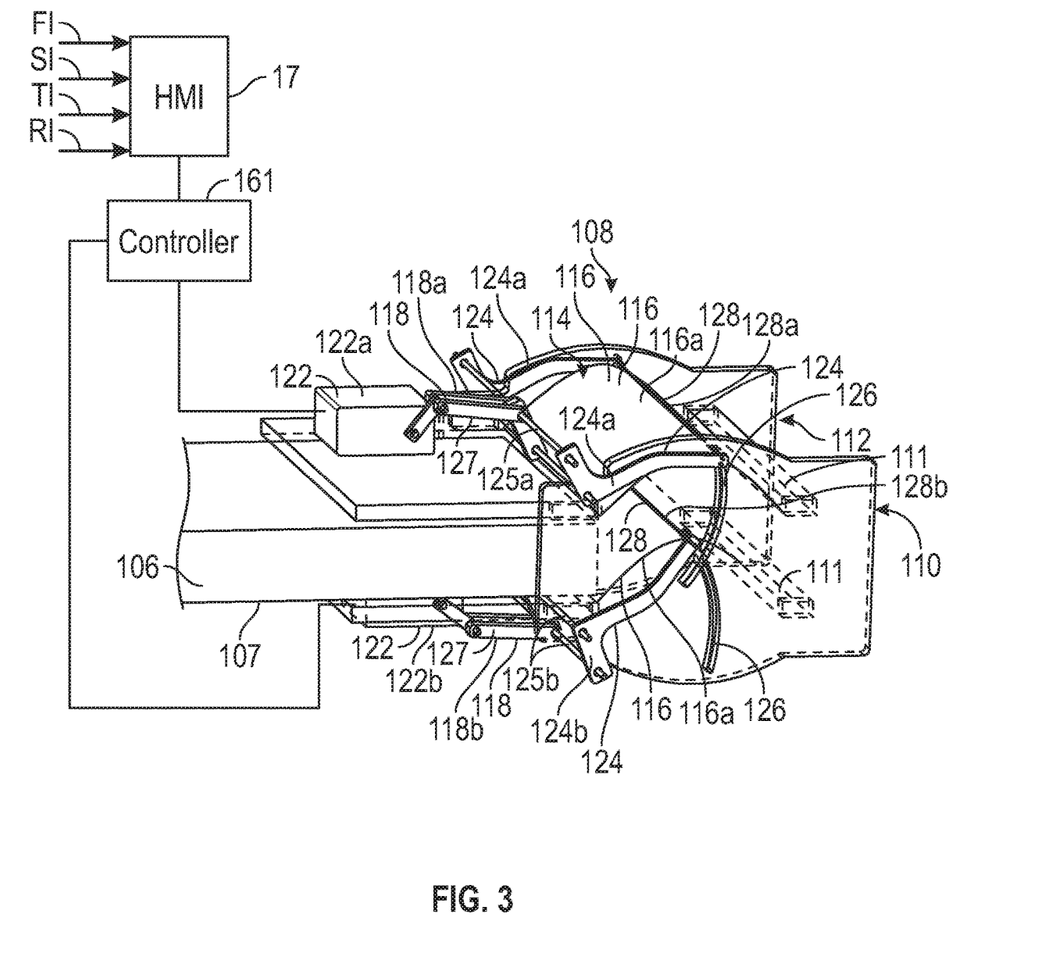
FIG. 3 is a schematic perspective view of the vaneless ventilation system, depicting its inner components.

With reference to FIG. 3, the vent assembly 108 includes a rigid housing 110 mechanically coupled to the rigid duct 106. The rigid housing 110 defines an outlet 112, which in turn defines the vent 16. Thus, the vent 16 is part of the rigid housing 110. The rigid housing 110 also has duct continuation bars 111 partially defining the outlet 112. The vent assembly 108 further includes a bendable duct 114 disposed inside or at least surrounded by the rigid housing 110. The bendable duct 114 is partly or wholly made of a material that is less stiff than the material forming the rigid duct 106, thereby allowing the bendable duct 114 to bend. In the depicted embodiment, the bendable duct 114 includes a pair of bendable duct walls 116 disposed proximate to the outlet 112. In addition to the bendable duct walls 116, the vent assembly 108 includes one or more linkage assemblies 118 coupled to the bendable duct 114 to allow deflection of the bendable duct upon movement of the linkage assembly 118. The linkage assembly 118 may include one or more four-bar linkages (i.e., parallelogram linkages) 127 coupled to the bendable duct 114. The vent assembly 108 further includes one or more actuation mechanisms 122 coupled to the linkage assemblies 118. Actuating the actuation mechanisms 122 causes the linkage assemblies 118 to move, thereby deflecting the bendable duct 114 across an infinite number o positions. In the depicted embodiment, the actuation mechanisms 122 are servo motors capable of moving the linkage assemblies 118.

In the depicted embodiment, the vent assembly 108 includes a first linkage assembly 118a (i.e., the upper linkage assembly) and a second linkage assembly 118b (i.e., the lower linkage assembly). Further, in the depicted embodiment, the vent assembly 108 includes a first actuation mechanism 122a (i.e., the upper actuation mechanism) and a second actuation mechanism 122b (i.e., the lower actuation mechanism). Each of the first actuation mechanism 122a and the second actuation mechanism 122b may be a servo motor. The pair of bendable duct walls 116 include a first bendable wall 116a (i.e., the upper wall) and a second bendable wall 116b (i.e., the lower wall). The first actuation mechanism 122a is directly coupled to the first linkage assembly 118a. Therefore, actuating the first actuation mechanism 122a causes the first linkage assembly 118a to move, thereby deflecting the first bendable wall 116a. The second actuation mechanism 122b is directly coupled to the second linkage assembly 118b. Therefore, actuating the second actuation mechanism 122b causes the second linkage assembly 118b to move, thereby deflecting the second bendable wall 116b.

With continued reference to FIG. 3, the vent assembly 108 further includes a plurality of arms 124 coupled between the bendable duct 114 and the linkage assemblies 118 to allow deflection of the bendable duct 114 upon movement of the linkage assemblies 118. The arms 124 are slidably coupled to the rigid housing 110. To this end, the rigid housing 110 defines a plurality of curved slots 126. Each of the curved slots 126 slidably receives a portion of one of the arms 124 to guide the movement of the arms 124 relative to the rigid housing 110. The vent assembly 108 further includes a plurality of wires 128 coupled to the plurality of arms 124 to control the shape of the bendable duct 114 upon movement of the linkage assemblies 118. The wires 128 may be in direct contact with the bendable duct walls 116 to facilitate movement of the bendable duct 114 upon actuation of the actuation mechanism 122 (and movement of the linkage assemblies 118).

In the depicted embodiment, the vent assembly 108 includes a first pair of arms 124a (i.e., the upper arms) and a second pair of arms 124b (i.e., the lower arms). A pair of first rods 125a directly interconnect the first linkage assembly 118a to the first pair of arms 124a. Accordingly, moving the first linkage assembly 118a causes the first pair of arms 124a to move. A second pair of second rods 125b directly interconnect the second linkage assembly 118a and the second pair of arms 124b. Accordingly, moving the second linkage assembly 118b causes the second pair of arms 124b to move. The vent assembly 108 includes a first wire 128a and a second wire 128b. The first wire 128a directly interconnects the first pair of arms 124a. The second wire 128b directly interconnects the second pair of arms 124b.

Figure 4:
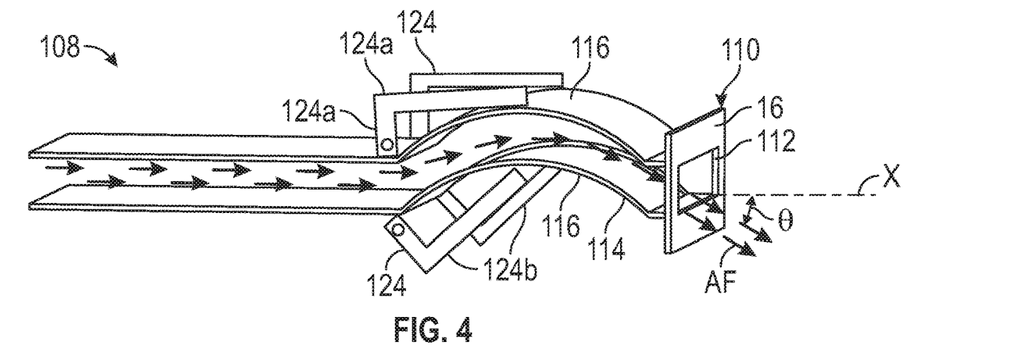
FIG. 4 is a schematic illustration of the vaneless ventilation system, wherein the bendable duct is in an upward-deflection position.

The vaneless ventilation system 100 further includes a controller 161 in electronic communication with the HMI 17 in order to receive user commands through the HMI 17. Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, control routines, code, algorithms and similar terms mean any controller-executable instruction sets including calibrations and look-up tables. Communications between controllers and communications between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The controller 161 is in electronic communication with the first actuation mechanism 122a and the second actuation mechanism 122b in order to control the actuation of the first actuation mechanism 122a and the second actuation mechanism 122b. As discussed above, the controller 161 is configured to receive user commands via the HMI 17. In response to those user commands, the controllers 161 controls the actuation of the first actuation mechanism 122a and the second actuation mechanism 122b in order to adjust the direction of the airflow AF (FIG. 4). For instance, the HMI 17 may receive a first command input FI (i.e., an upward command input), a second command input SI (i.e., a downward command input), a third command input TI (i.e., a straight-horizontal command input), and/or a fourth command input RI (i.e., a close-vent command input). In operation, the HMI 17 communicates those inputs to the controller 161.

FIGS. 4-7 shows the operation of the vent assembly 108. In response to receiving the first command input FI through the HMI 17, the controller 161 actuates the first actuation mechanism 122a and the second actuation mechanism 122b to move the arms 124 (i.e., the first pair of arms 124a and the second pair of arms 124b) to the position shown in FIG. 4. As shown in FIG. 4, the arms 124 are movable to a position to cause an upward deflection of the bendable duct 114. As a consequence, the airflow AF is directed in a downward direction. The direction of the airflow AF may be expressed as an angle θ that is measured from a horizontal axis X to the direction of the airflow AF. The upward deflection of the bendable duct 114 causes the airflow AF to flow at an angle θ that is between −15 degrees and −45 degrees in order to direct the airflow in the downward direction.

Figure 5:
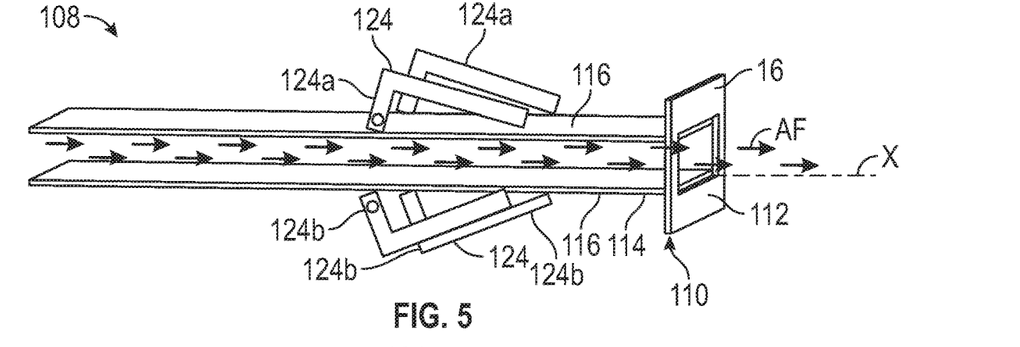
FIG. 5 is a schematic illustration of the vaneless ventilation system, wherein the bendable duct is in a no-deflection position.

In response to receiving the second command input SI through the HMI 17, the controller 161 actuates the first actuation mechanism 122a and the second actuation mechanism 122b to move the arms 124 (i.e., the first pair of arms 124a and the second pair of arms 124b) to the position shown in FIG. 5. As shown in FIG. 5, the arms 124 are movable to a position that does not cause deflection of the bendable duct walls 116. As a result, the airflow AF is directed in a horizontal, straight direction. No deflection on the bendable duct 114 causes the airflow AF to flow at an angle θ that is zero in order to direct the airflow in the horizontal, straight direction.

Figure 6:
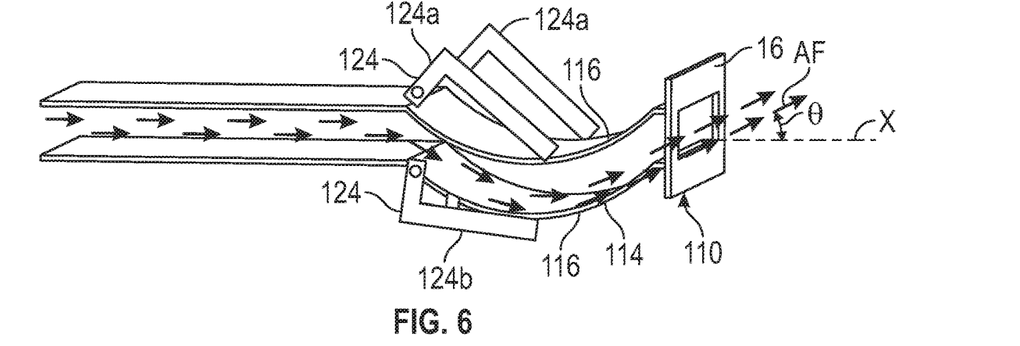
FIG. 6 is a schematic illustration of the vaneless ventilation system, wherein the bendable duct is in a downward-deflection position.

In response to receiving the third command input TI through the HMI 17, the controller 161 actuates the first actuation mechanism 122a and the second actuation mechanism 122b to move the arms 124 (i.e., the first pair of arms 124a and the second pair of arms 124b) to the position shown in FIG. 6. As shown in FIG. 6, the arms 124 are movable to a position to cause a downward deflection of the bendable duct walls 116. Consequently, the airflow AF is directed in an upward direction.

Figure 7:
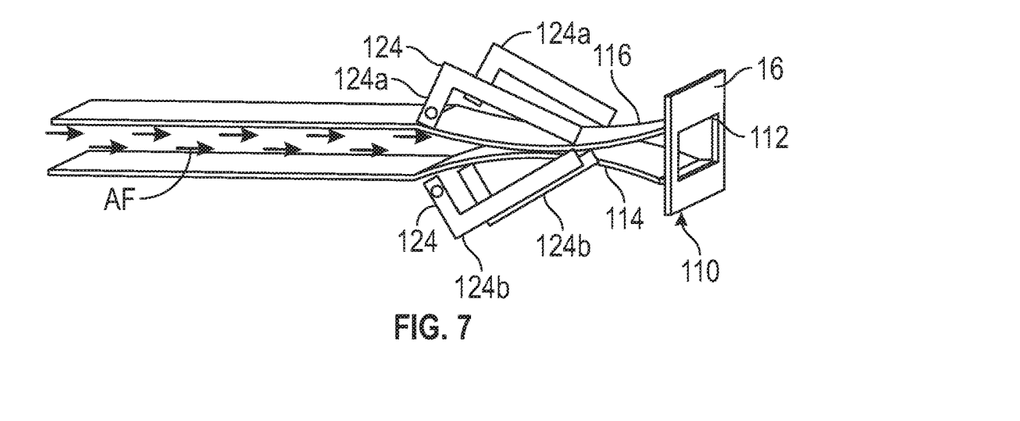
FIG. 7 is a schematic illustration of the vaneless ventilation system, wherein the bendable duct is in an inward-deflection position.

In response to receiving the fourth command input RI through the HMI 17, the controller 161 actuates the first actuation mechanism 122a and the second actuation mechanism 122b to move the arms 124 (i.e., the first pair of arms 124a and the second pair of arms 124b) to the position shown in FIG. 7. As shown in FIG. 7, the arms 124 are movable to a position to cause an inward deflection of the bendable duct 114. As a consequence, the airflow AF does not exit through the outlet 112 (i.e., the vent 16 is closed). The inward deflection of the bendable duct 114 precludes the air from exiting the through the outlet 112 of the vent 16.

Figure 8:
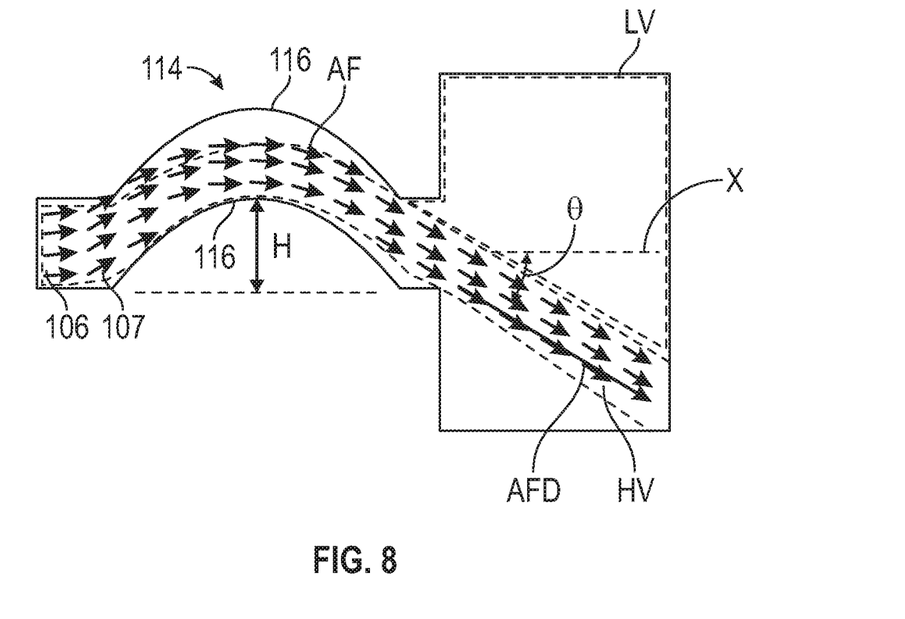
FIG. 8 is a schematic illustration depicting the fluid dynamics of the vaneless ventilation system.
Figure 9:
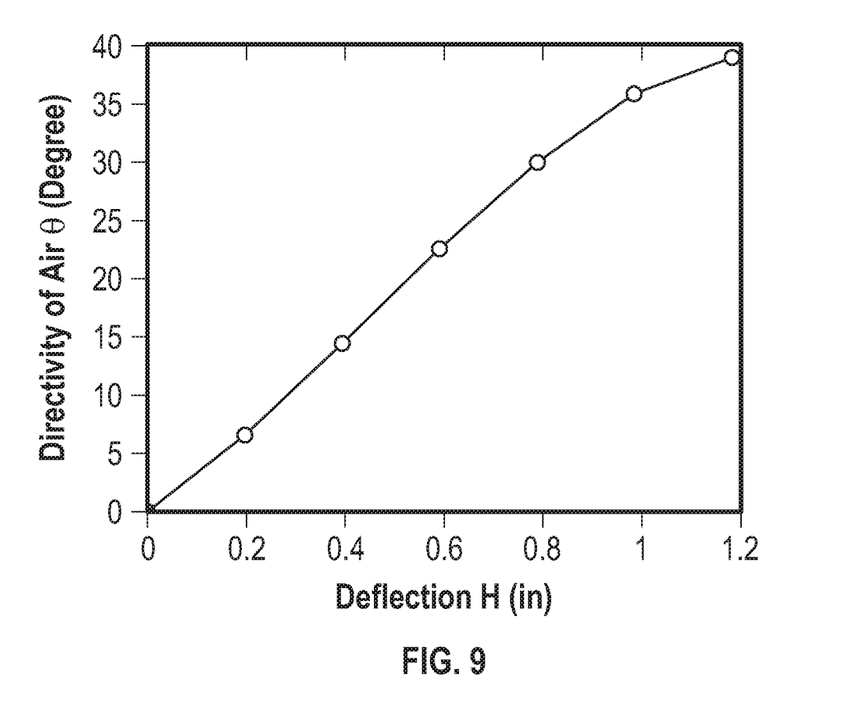
FIG. 9 is a graph showing the relationship between the deflection of the bendable duct of the vaneless ventilation system and the directivity of the airflow.

FIG. 8 is a graph depicting the fluid dynamics of the vaneless ventilation system 100. Specifically, the graph shows the velocity field of the airflow AF when the bendable duct 114 is bent. The first areas LV indicate low-velocity regions, and HV indicate high-velocity regions. The deflection H of the bendable duct 114 is a distance measured from the lowest wall 107 of the rigid duct 106 to an uppermost portion of the one of the bendable duct walls 116 (i.e., the lowest bendable duct wall). The graph also shows the direction of the airflow AF (as an angle θ) when the bendable duct 116 is bent. The angle θ is measured from a horizontal axis X to a vector AFD representation of the direction of the airflow AF. FIG. 9 is a graph showing the relationship between the deflection H of the bendable duct walls 116 of the vaneless ventilation system 100 and the direction (i.e., directivity) of the airflow AF.

Figure 10:
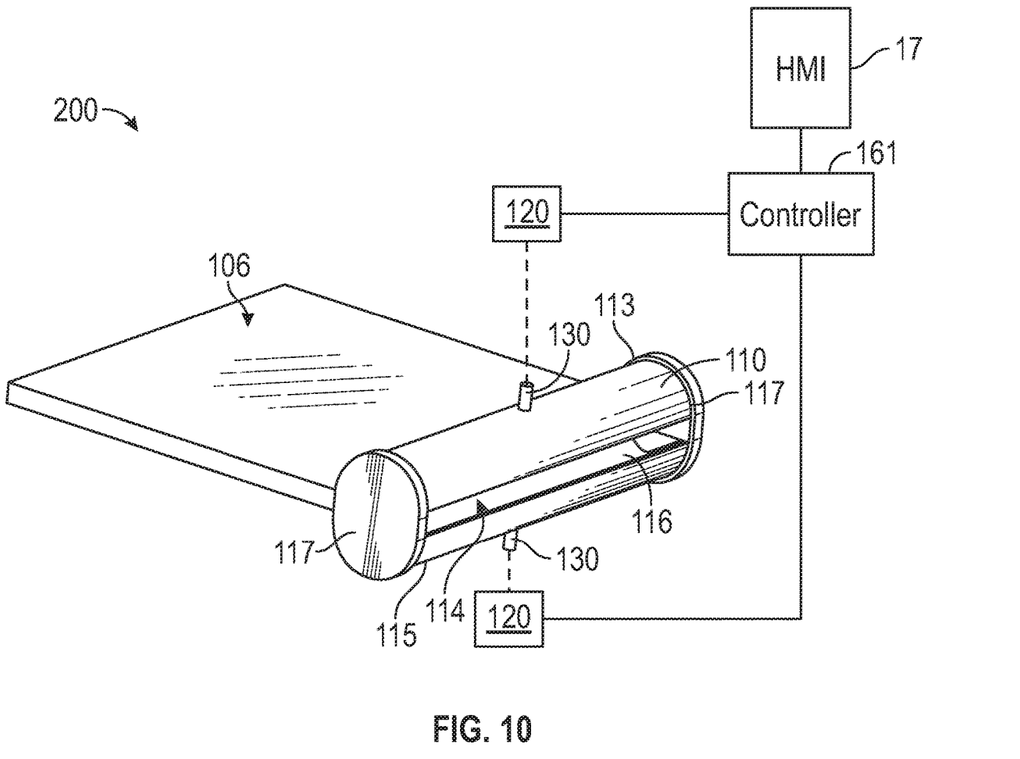
FIG. 10 is a schematic perspective view of the vaneless ventilation system according to another embodiment of the present disclosure, including a pneumatic actuator.
Figure 11:
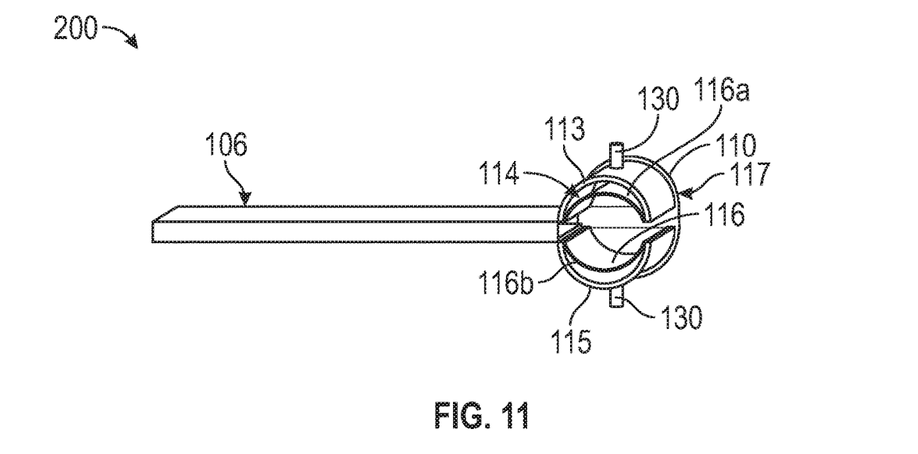
FIG. 11 is schematic side view of the rigid duct and the rigid housing of the vaneless ventilation system of FIG. 10 without one of the end caps.

With reference to FIGS. 10 and 11, in another embodiment of the vaneless ventilation system 200, the actuation mechanisms 120 are pneumatic actuators capable of pumping air into the rigid housing 110 or draw a vacuum in the rigid housing 110 adjust the bendable duct 114 across an infinite number of position. The actuation mechanisms 120 are in electronic communication with the controller 161. Accordingly, the controller 161 is configured to control the operation of the actuation mechanisms 120. Further, as discussed above, the controller 161 is programmed to receive user commands through the HMI 17. The rigid housing 110 is configured as a hard, external shell and includes a first half-portion 113 and a second half-portion 115. Each of the first half-portion 113 and the second half-portion 115 is coupled to the rigid duct 106. Two end caps 117 help connect the first half-portion 113 and the second half-portion 115 to each other. Accordingly, the rigid duct 106 is in fluid communication with the rigid housing 110. Each of the first half-portion 113 and the second half-portion 115 includes a hose connector 130 to couple to one of the actuation mechanisms 120 (i.e., the pneumatic actuator) to draw a vacuum or pump a gas (e.g., air) inside the rigid housing 110, thereby facilitating deflection of the bendable duct 114. As discussed above, the bendable duct 114 is made of a relatively low stiffness material, whereas the rigid housing 110 is made of a relatively high stiffness material. The bendable duct walls 116 (i.e., the first bendable wall 116a and the second bendable walls 116b) may function as an elastic bladder to provide proportional airflow control. If the bendable duct walls 116 (e.g., the membrane walls) at the outlet 112 are elastic and can be stretched, the material forming the bendable duct walls 116 can be inflated or vacuumed into different curvatures, allowing for the airflow direction to be positioned anywhere between the two extremes. The bendable duct walls 116 of the vaneless ventilation system 100 could also be deployed using a HVAC blower system rather than needing the addition of a pump/vacuum. If the air from the HVAC blower system could be redirected to the bendable duct walls 116 of the vent assembly 108 in addition to down the rigid duct 106, that air could be used to move the wall to the "pumped" position. Conversely, if that blower air were circulated across (not in or through) holes along the rigid wall, the pressure in the rigid wall and less stiff membrane cavity would drop and pull the membrane to the "vacuum" position.

Figure 12:
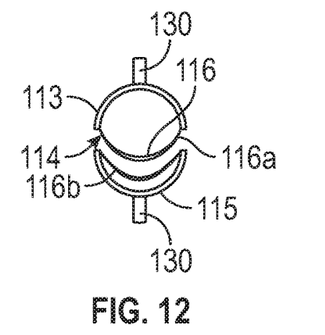
FIG. 12 is a schematic side sectional view of the vaneless ventilation system, wherein the bendable duct is in an upward-deflection position.

As shown in FIG. 12, the actuation mechanisms 120 (i.e., the pneumatic actuator) may pump air into the one hose connector 130 (i.e., the upper hose connector 130) and draw a vacuum through another hose connector 130 (i.e., the lower hose connector 130) to move the bendable duct 114 to the upward deflection position. Due to the slack in one of the bendable duct walls 116 (i.e., the first bendable wall 116a), this bendable duct wall 116 is pushed downwardly toward the second half-portion 115 of the rigid housing 110 as gas (e.g., air) is pumped into the rigid housing 110 through the upper hose connector 130. Due to the slack in one of the bendable duct walls 116 (i.e., the second bendable wall 116b), this bendable duct wall 116 moves toward the second half-portion 115 of the rigid housing 110 as gas (e.g., air) is sucked out the rigid housing 110 through the lower hose connector 130.

Figure 13:
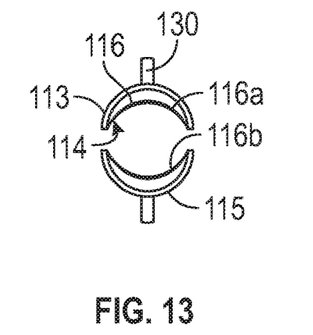
FIG. 13 is a schematic side sectional view of the vaneless ventilation system of FIG. 10, wherein the bendable duct is in a no-deflection position.

As shown in FIG. 13, the actuation mechanisms 120 (i.e., the pneumatic actuator) may both draw a vacuum through both hose connectors 130 to move the bendable duct 114 to the straight (no deflection) position. Due to the slack in one of the bendable duct walls 116 (i.e., the first bendable wall 116a), this bendable duct wall 116 is drawn upwardly toward the first half-portion 113 of the rigid housing 110 as gas (e.g., air) is sucked out of the rigid housing 110 through the upper hose connector 130. Due to the slack in one of the bendable duct walls 116 (i.e., the second bendable wall 116b), this bendable duct wall 116 moves toward the second half-portion 115 of the rigid housing 110 as gas (e.g., air) is sucked out the rigid housing 110 through the upper hose connector 130.

Figure 14:
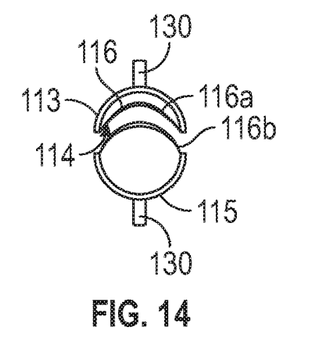
FIG. 14 is a schematic side sectional view of the vaneless ventilation system of FIG. 10, wherein the bendable duct is in a downward-deflection position.
Figure 15:
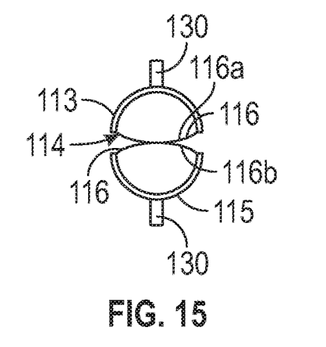
FIG. 15 is a schematic side sectional view of the vaneless ventilation system of FIG. 10, wherein the bendable duct is in an inward-deflection position.
Figure 16:
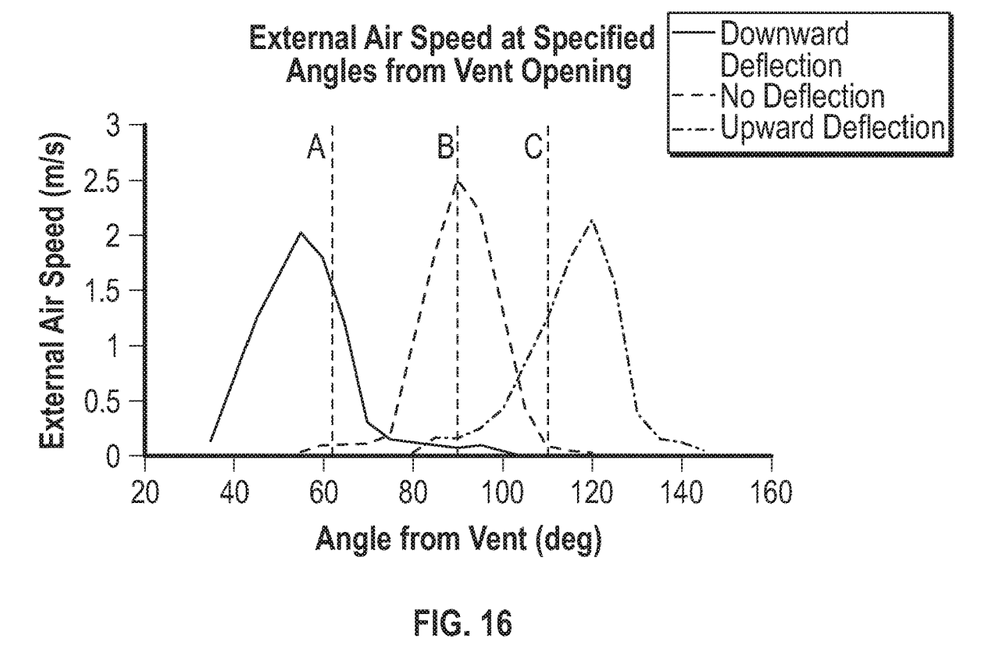

As shown in FIG. 14, the actuation mechanisms 120 (i.e., the pneumatic actuator) may pump air into the one hose connector 130 (i.e., the lower hose connector 130) and draw a vacuum through another hose connector 130 (i.e., the upper hose connector 130) to move the bendable duct 114 to the downward deflection position. Due to the slack in one of the bendable duct walls 116 (i.e., the second bendable wall 116b), this bendable duct wall 116 is pushed upwardly toward the first half-portion 113 of the rigid housing 110 as gas (e.g., air) is pumped into the rigid housing 110 through the lower hose connector 130. Due to the slack in one of the bendable duct walls 116 (i.e., the first bendable wall 116a), this bendable duct wall 116 moves toward the first half-portion 113 of the rigid housing 110 as gas (e.g., air) is sucked out the rigid housing 110 through the upper hose connector 130. As shown in FIG. 15, the actuation mechanisms 120 (i.e., the pneumatic actuator) may pump air into both hose connectors 130 (i.e., the lower hose connector 130 and the upper hose connector 130) to move the bendable duct 114 to the inward-deflection position. In the inward-deflection position, the first bendable wall 116a and the second bendable duct 116a are in direct contact with each other, thereby precluding flow of gas through the bendable duct 114. FIG. 16 is a graph showing the relationship of the vent angle θ and the external air speed for each position of the bendable duct walls 116. As shown in this graph, the external air speed may be maximized at certain vent angles θ for each position (i.e., the downward deflection position, the no deflection position, and the upward deflection position).

Figure 17:
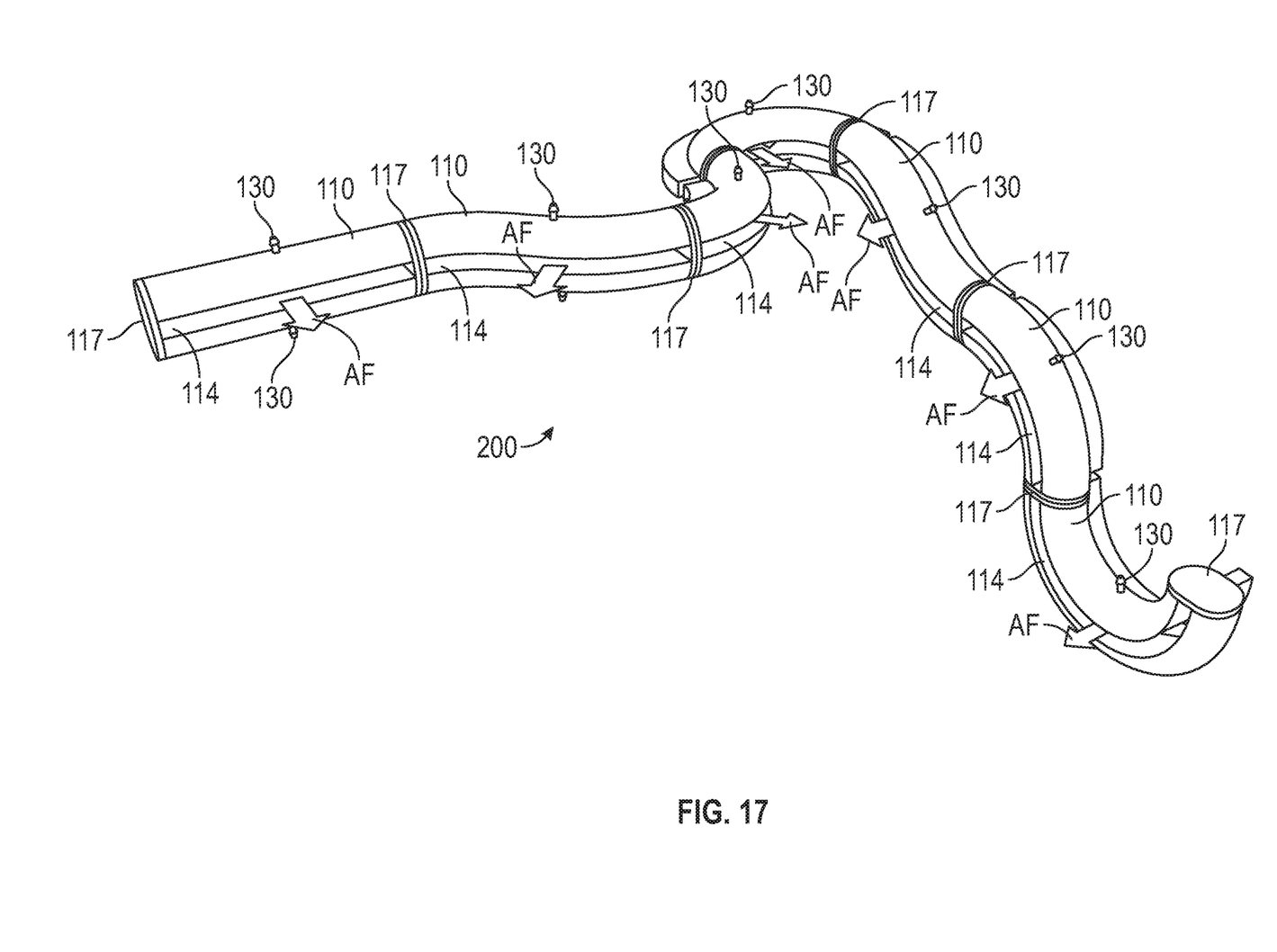
FIG. 17 is a schematic perspective view of the vaneless ventilation system having a complex shape.

With reference to FIG. 17, the vaneless ventilation system 200 includes multiple rigid housings 110, multiple bendable duct 114, and multiple hose connectors 130. The vaneless ventilation system 200 may be made of a corrugated semi-rigid housing in order to form arbitrary shapes, and may be conformed to the compartment to which it is installed as exemplified in FIG. 17. In addition, the rigid housing 130 may be inflexible and can be manufactured in an arbitrary shape.

Figure 18:
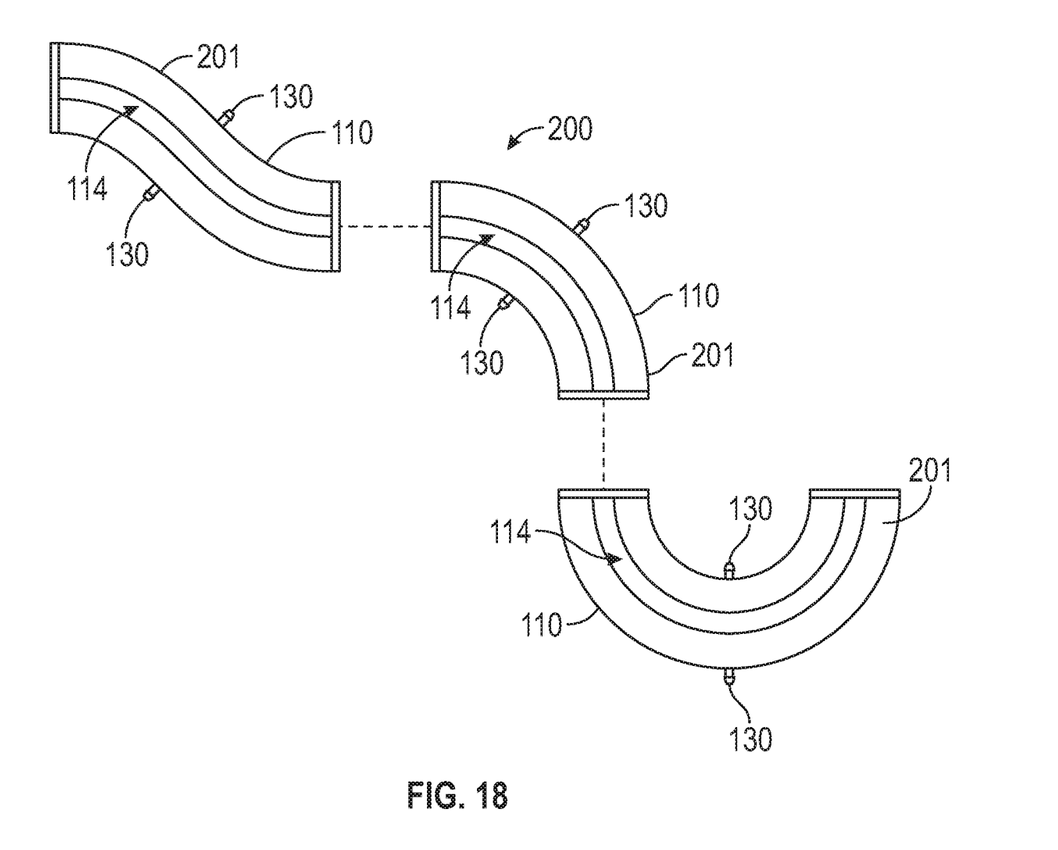
FIG. 18 is a schematic, front exploded view of the vaneless ventilation system having a complex shape.
Figure 19:
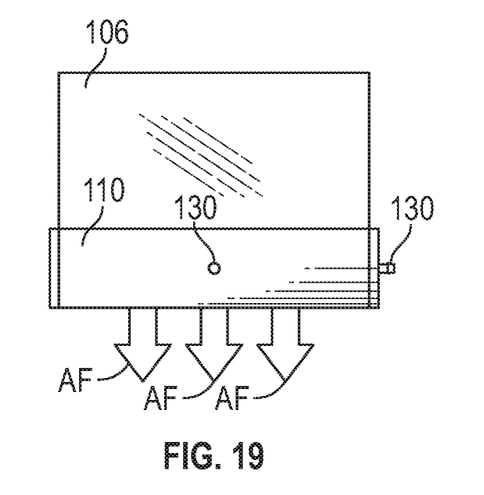
FIG. 19 is a schematic top view of a vaneless ventilation system capable of changing the direction of air flow AF on horizontal plane, depicting the air flow in a forward direction.
Figure 20:
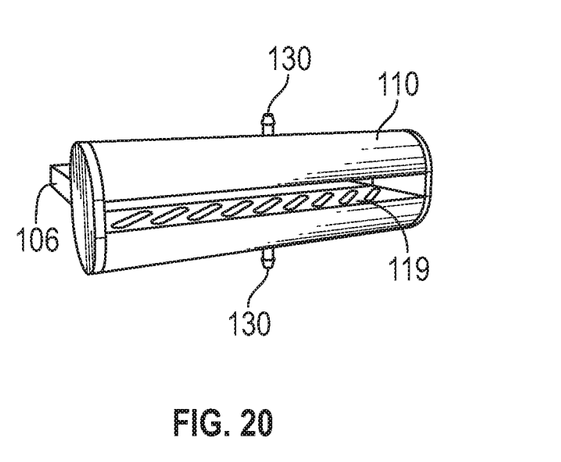
FIG. 20 is a schematic perspective view of the vaneless ventilation system of FIG. 19.
Figure 21:
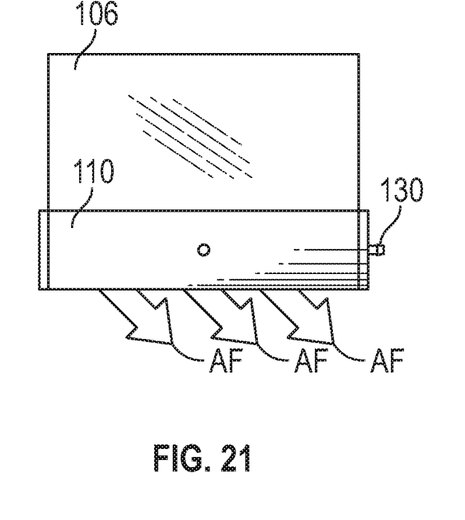
FIG. 21 is a schematic top view of the vaneless ventilation system capable of FIG. 19, depicting the air flow in a right direction.
Figure 22:
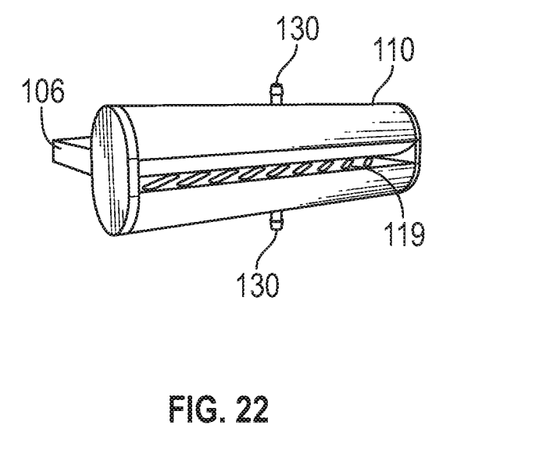
FIG. 22 is a schematic perspective view of the vaneless ventilation system of FIG. 21.
Figure 23:
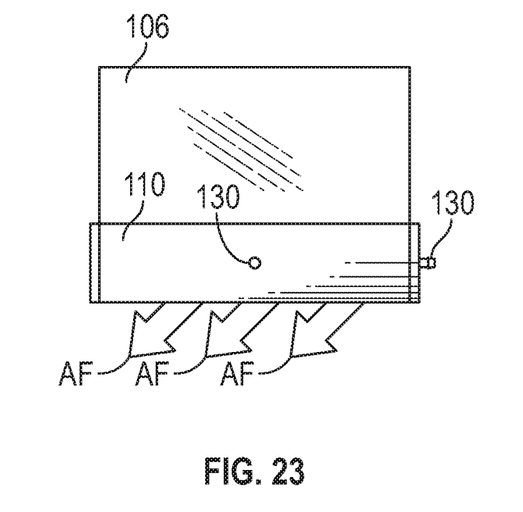
FIG. 23 is a schematic top view of the vaneless ventilation system capable of FIG. 19, depicting the air flow in a left direction.
Figure 24:
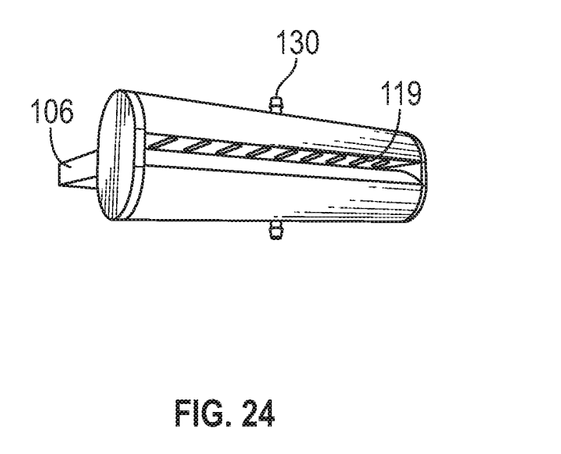
FIG. 24 is a schematic perspective view of the vaneless ventilation system of FIG. 23.

As shown in FIG. 18, the vaneless ventilation system 200 may include modular units 201 that can be attached together as illustrated in order to create arbitrary shapes within vehicle 10 on different trim panels 14. This would allow complex three-dimensional formations of vaneless ventilation system 200 within which each individual modular unit 201 may be controlled separately with their respective hose connectors 130.

With reference to FIGS. 19-24, the bendable duct 114 that can be deflected by drawing a vacuum or pumping a gas inside and may accommodate another flexible layer 119, which can be actuated via separate hose connectors 130 in order to change the direction of air flow AF on horizontal plane. As illustrated in FIG. 3, with pneumatically actuated textures (i.e., the flexible layer 119) that can be manufactured with different geometries, may provide horizontal direction control and may be either used in combination with or without pneumatically deflected main bendable ducts 114.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims. For instance, the presently disclosed vaneless ventilation system may include one servomotor coupled to linkage assemblies and one or more pneumatic actuators in fluid communication with the rigid housing.

What is claimed is:

1. A vaneless ventilation system comprising:
   a rigid duct;
   a vent assembly in fluid communication with the rigid duct, wherein the vent assembly includes:
      a rigid housing defining an outlet, wherein the outlet is an opening;
      a bendable duct disposed inside the rigid housing, wherein the bendable duct includes a first bendable duct wall and a second bendable duct wall, and the bendable duct is movable between an open position and a closed position; and
      an actuation mechanism coupled to the bendable duct, wherein actuation of the actuation mechanism causes the bendable duct to deflect to control a direction of an airflow exiting through the outlet;
   wherein, when the bendable duct is in the open position, the first bendable duct wall and the second bendable duct wall are spaced apart from each other to allow an airflow between the first bendable duct wall and the second bendable duct wall;
   wherein, when the bendable duct is in the closed position, the first bendable duct wall and the second bendable duct wall are bended inwardly toward each other and in direct contact with each other to block the airflow between the first bendable duct wall and the second bendable duct wall;
   wherein the opening is open when the bendable duct is in the open position, and the opening is open when the bendable duct is in the closed position;
   wherein the vaneless ventilation system further comprises a linkage assembly coupled to the bendable duct to allow deflection of the bendable duct upon movement of the linkage assembly;
   wherein the vaneless ventilation system further comprises a plurality of arms coupled between the bendable duct and the linkage assembly to allow deflection of the bendable duct upon movement of the linkage assembly; and
   wherein the vaneless ventilation system further comprises a plurality of wires directly coupled to the plurality of arms to control a shape of the bendable duct upon movement of the linkage assembly.

2. The vaneless ventilation system of claim 1, wherein the actuation mechanism is a servo motor.

3. The vaneless ventilation system of claim 2, wherein the linkage assembly includes a four-bar linkage.

4. The vaneless ventilation system of claim 3, wherein the plurality of arms is slidably and directly coupled to the rigid housing.

5. The vaneless ventilation system of claim 4, wherein the rigid housing defines a plurality of curved slots, wherein each of the plurality of curved slots slidably receives a portion of one of the plurality of arms to guide a movement of the plurality of arms relative to the rigid housing, and the portion of the one of the plurality of arms is dimensioned to slide along one of the plurality of curved slots as the plurality of arms move relative to the rigid housing.

6. The vaneless ventilation system of claim 1, wherein the rigid housing includes a first material, the bendable duct includes a second material, the first material has a first stiffness, the second material has a second stiffness, and the first stiffness is greater than the second stiffness.

7. The vaneless ventilation system of claim 1, further comprising a controller in electronic communication with the actuation mechanism, a linkage assembly coupled to the bendable duct to allow deflection of the bendable duct upon movement of the linkage assembly, a plurality of arms coupled between the bendable duct and the linkage assembly to allow deflection of the bendable duct upon movement of the linkage assembly, and a wire directly coupled to the plurality of arms to control a shape of the bendable duct upon movement of the linkage assembly, wherein the wire is in direct contact with the bendable duct to facilitate movement of the bendable duct upon actuation of the actuation mechanism.

8. The vaneless ventilation system of claim 7, wherein the controller is programmed to:
   actuate the actuation mechanism to move the arms to a position to cause an upward deflection of the bendable duct, thereby directing the airflow in a downward direction;
   actuate the actuation mechanism to move the arms to a position that does not deflect the bendable duct, thereby directing the airflow in a horizontal, straight direction;
   actuate the actuation mechanism to move the arms to a position to cause a downward deflection of the bendable duct, thereby directing the airflow in an upward direction; and actuate the actuation mechanism to move the arms to a position to cause an inward deflection of the bendable duct, thereby precluding the airflow through the bendable duct.

* * * * *